Patented Feb. 8, 1938

2,107,839

UNITED STATES PATENT OFFICE

2,107,839

THERAPEUTIC DERIVATIVE OF THE GENUS LACTUCA AND PROCESS OF PREPARING SAME

Gerhard Schenck, Ludwigshafen-on-the-Rhine, Germany, assignor to E. Bilhuber, Inc., Jersey City, N. J., a corporation of New Jersey No Drawing. Application August 5, 1937, Serial No. 157,523. In Germany June 23, 1936

9 Claims. (Cl. 87—28)

Lactucarium, the dried latex obtained from mechanical species of the genus Lactuca (such as *Lactuca virosa* Linné and *Lactuca sagitata* variete altissima) has been long since proposed and to some extent used as a mild narcotic, sedative or anti-spasmodic. The product was obtained by incising or transversely cutting a shoot or young plant and collecting the exuded latex. The latex was allowed to stand several days in the open, during which time it would coagulate or gel, and it was then removed from the vessel and slowly dried in the air with the application of mild heat. The resulting Lactucarium took the form of lumps of tenacious consistence, having a deep brown color externally and a gray to yellowish white internal color. On account of the variable therapeutic activity of the product, which frequently was without appreciable activity, it long since fell into disfavor, and became supplanted by opium and its derivatives which proved to be far more reliable and effective in application.

The present invention accordingly aims primarily to provide a Lactuca derivative of substantial and uniform therapeutic activity, and in a form advantageous for the further preparation of pharmaceutical products therefrom, and also includes certain procedures by which such a product of the desired character may be obtained.

The fresh fluid latex obtained as above described is in the nature of an emulsion having approximately the following composition:

| | Percent |
|---|---|
| Water | 78 |
| Water soluble constituents | 10 |
| Water insoluble constituents | 12 |

I have discovered that the active principles of the latex are virtually all contained in the water soluble constituents thereof, and that in achieving the objects of the invention it is important to separate the insoluble constituents of the latex from the soluble constituents thereof prior to the removal of water, in contrast with the methods formerly employed wherein the removal of water was carried out in the presence of the water insoluble constituents.

For example if fresh latex collected as above referred to, is allowed to stand in a container sealed to prevent evaporation, the emulsion breaks and a spontaneous coagulation occurs which separates the material into an aqueous solution component and a solid component. The aqueous solution which contains the active constituents can be suitably separated from the inactive solids, as by vacuum filtering or centrifuging; the water may then be removed from the solution, as by evaporation in a vacuum.

The Lactuca derivative as thus obtained will be in the form of a stable, dry and water soluble powder, much more highly active and uniform as to activity, and substantially free of all diluent materials which might interfere with absorption. The product is an amorphous powder, brownish in color, and has an intensely bitter taste; it begins to sinter at 120° C. and is completely softened at a temperature of 140° to 150° C.; it is easily soluble in water and in various dilutions of alcohol up to about 70% by volume as well as in ethylene glycol and glycerin, but is difficultly soluble in absolute alcohol as well as in most organic solvents. The product has substantial advantages for use in pharmaceutical preparations by virtue of its water soluble form, and because its active constituents may be isolated in a form which is stable during storage; uniformity in dosage is assured by the uniformity of the product, and on account of the separation of the inactive constituents the therapeutic doses can be reduced to less than half as compared to the solid residue of latex if dried in accordance with prior procedure.

According to another and preferred method of separating the water soluble constituents from the insoluble in accordance with the present invention, the fresh latex may be mixed either with water in quantity sufficient to break down the emulsion, or mixed with an aqueous solution containing reducing agents such as sulfurous acid, sodium bisulphite, tartaric acid, citric acid, or formaldehyde, or other water soluble mildly acting reducing agents which do not decompose the active constituents, in small amounts. The subsequent treatment may then include filtering or centrifuging, discarding the inactive solid ingredients, and evaporating to obtain the active constituents in concentrated form as previously described.

Example 1

After cutting or incising the plant as above described, the fresh exuded latex is scraped off and transferred to a container such as a flask or jug of 100 to 200 cc. capacity. After filling, the container is tightly sealed to avoid any evaporation or oxidation; I have found that decomposition of the active constituents takes place upon exposure to air as was done according to prior practice. Upon standing for about a day, the emulsion breaks and a spontaneous separation into solid and liquid components occurs. The thus separated liquid component, containing the active constituents, is then removed by filtration, preferably vacuum filtration, or by centrifuging. Any part of the solution which is retained by the solids may be removed by washing and expressing, and added to the separated liquid.

In order to avoid fungus growth and putrefaction, a preservative, such as amidobenzoic acid, salicylic acid or like substances, may be added to the solution. The compound is a favorable medium to fungus growth because of its relatively high (3 to 4%) sugar content.

The solution is then preferably heated to about 80° C. in order to destroy the oxidase contained therein. Complete destruction of the oxidase can be determined by applying the test of Whitby (Kolloid Zeitschrift, vol. 12 (1913) page 149). I have found that the presence of oxidases in Lactucarium prepared in accordance with the prior practice, was an important cause of decomposition of the active principles.

The solution is then subjected to evaporation under vacuum, thus producing a product in powdered form which contains the active constituents, as above described. This product may be used for pharmaceutical purposes either in powdered form, in tablets or in solution, mixture or emulsion.

Example 2

The fresh latex obtained as described above, is transferred to a vessel and mixed either with water in quantity sufficient to break down the emulsion, or with an aqueous solution of reducing agents of the character above set forth. The latex then coagulates much more rapidly than in Example 1 into a liquid component containing the active ingredients, and a solid inactive component. The solid component is discarded by vacuum filtering or centrifuging, and the subsequent treatment of the liquid component may be in other respects the same as above described in connection with Example 1, to obtain an end product having similar qualities and characteristics.

Extensive research has led to the conclusion that the lactucarium of the prior art was weak and unreliable in therapeutic activity for the following primary reasons—the active constituents were decomposed by oxidation upon exposure to air; decomposition was accelerated by the presence in the latex of oxidases in relatively high concentration; the old method of preparation caused the active ingredients to concentrate at the surface of the solidified product, promoting further oxidation and producing irregularity of composition and activity; decomposition was further accelerated by fungus growth and putrefaction resulting from the relatively high sugar content. The above objections are eliminated in the product of the present invention.

While certain specific procedures have been described for producing a product having the desired qualities and characteristics, it should be understood that changes may be made therein without departing from the invention in its broader aspects, within the scope of the appended claims.

I claim:

1. A process of the character described for producing a therapeutic agent from latex of the genus Lactuca which includes breaking the emulsion of the latex to form a solid component and a liquid component containing therapeutically active ingredients, separating the solid component from the liquid, and then removing water from the liquid component to concentrate said active ingredients.

2. A process of the character described for producing a therapeutic agent from latex of the genus Lactuca, which includes adding water to the latex to break the emulsion into a solid component and a liquid component containing therapeutically active ingredients, separating the solid component from the liquid, and then removing water from the liquid component to concentrate said active ingredients.

3. A process of the character described for producing a therapeutic agent from latex of the genus Lactuca which includes allowing the latex to stand for a substantial period out of contact with oxygen to break the emulsion into a solid component and a liquid component containing therapeutically active ingredients, separating the solid component from the liquid, and then removing water from the liquid component to concentrate said active ingredients.

4. A process of the character described for producing a therapeutic agent from latex of the genus Lactuca, which includes adding water to the latex and also adding a mild reducing reagent to break down the emulsion into a solid component and a liquid component containing therapeutically active ingredients, separating the solid component from the liquid, and then removing water from the liquid component to concentrate said active ingredients.

5. A process of the character described for producing a therapeutic agent from latex of the genus Lactuca, which includes breaking the emulsion of the latex to form a solid component and a liquid component containing therapeutically active ingredients, separating the solid component from the liquid, heating said liquid to destroy oxidase contained therein, and then removing water from the liquid component to concentrate said active ingredients.

6. A process of the character described for producing a therapeutic agent from latex of the genus Lactuca, which includes breaking the emulsion of the latex to form a solid component and a liquid component containing therapeutically active ingredients, separating the solid component from the liquid, adding a putrefaction preventing reagent to said liquid, and then removing water from the liquid component to concentrate said active ingredients.

7. A water soluble medicinal compound adapted for use as a mild narcotic, sedative and antispasmodic, comprising therapeutically active constituents of latex of the genus Lactuca, said constituents being readily soluble in water, ethylene glycol and glycerin, and in various dilutions of alcohol up to about 70% by volume, and said compound being substantially free of the components of fresh latex which assume solid form when the emulsion is broken, and further characterized in that when extracted from a water solution said constituents assume the form of an amorphous powder, said constituents being substantially free of decomposition by oxidation.

8. A water soluble medicinal compound adapted for use as a mild narcotic, sedative and antispasmodic, comprising therapeutically active constituents of latex of the genus Lactuca, said constituents being readily soluble in water, ethylene glycol and glycerin, and in various dilutions of alcohol up to about 70% by volume, and said compound being substantially free of the components of fresh latex which assume solid form when the emulsion is broken, and further characterized in that when extracted from a water solution said constituents assume the form of an amorphous powder, said constituents being substantially free of decomposition by oxidation and said compound having a putrefaction preventing reagent combined therewith.

9. A medicinal compound as set forth in claim 7 in amorphous powder form.

GERHARD SCHENCK.

CERTIFICATE OF CORRECTION.

Patent No. 2,107,839. February 8, 1938.

GERHARD SCHENCK.

It is hereby certified that error appears in the printed specification of the above numbered patent requiring correction as follows: Page 1, first column, line 2, for the word "mechanical" read medicinal; and that the said Letters Patent should be read with this correction therein that the same may conform to the record of the case in the Patent Office.

Signed and sealed this 15th day of March, A. D. 1938.

(Seal)

Henry Van Arsdale,
Acting Commissioner of Patents.